March 5, 1935. H. A. IHDE 1,993,669
APPARATUS FOR MEASURING PERIODS OF TIME, PARTICULARLY
PSYCHO-PHYSICAL REACTION PERIODS
Filed Dec. 18, 1930 5 Sheets-Sheet 1
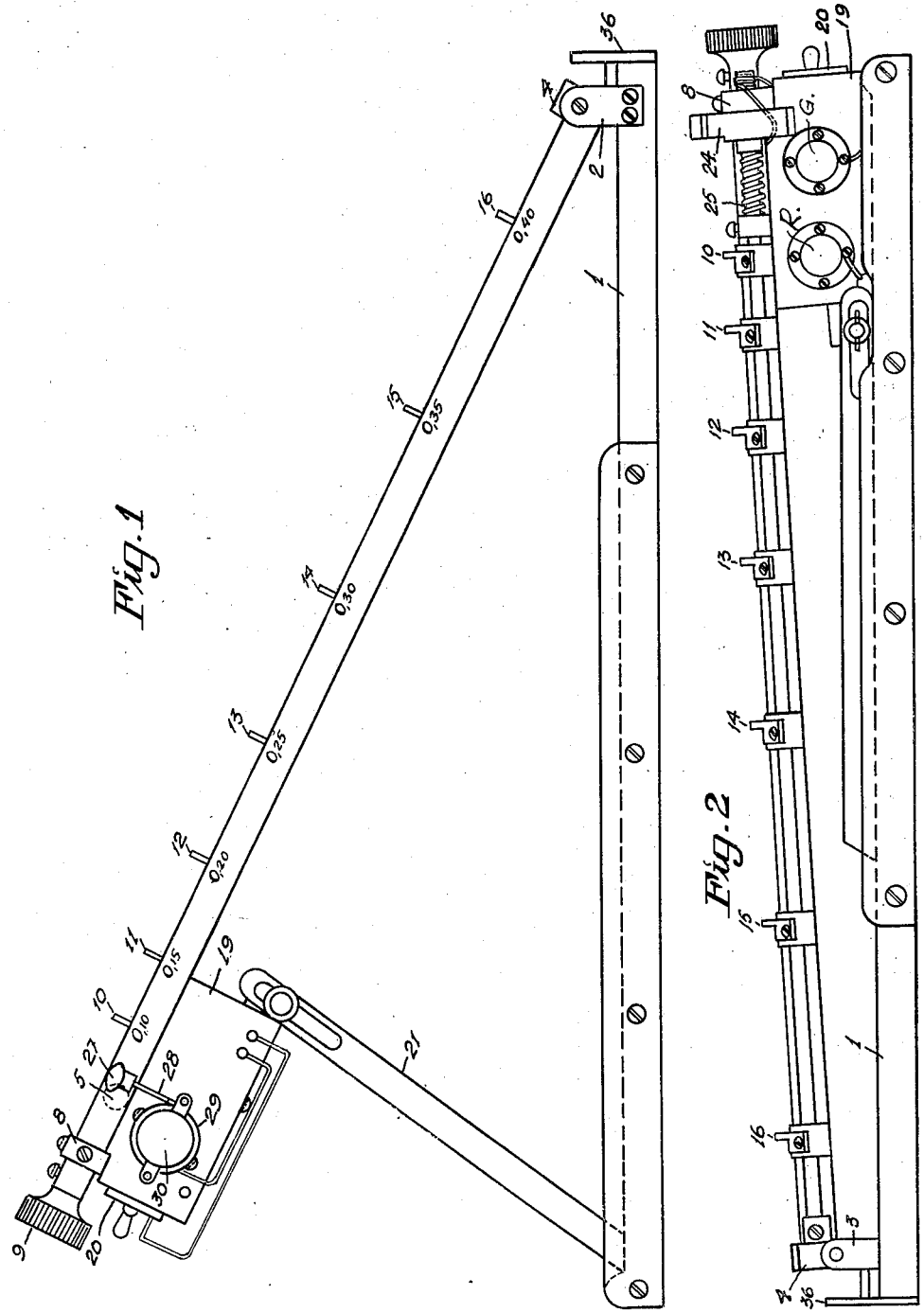

March 5, 1935.  H. A. IHDE  1,993,669
APPARATUS FOR MEASURING PERIODS OF TIME, PARTICULARLY
PSYCHO-PHYSICAL REACTION PERIODS
Filed Dec. 18, 1930  5 Sheets-Sheet 2
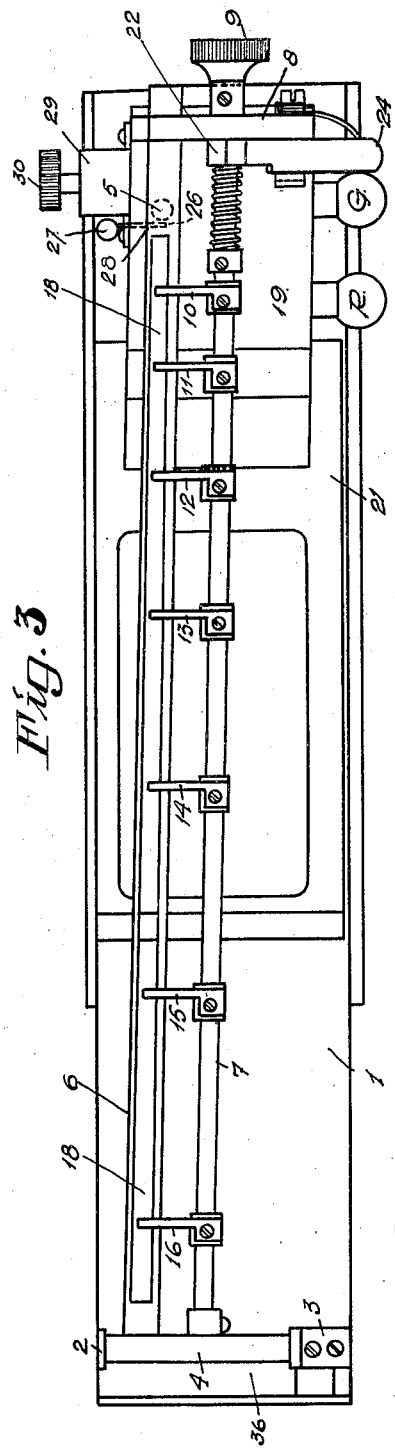
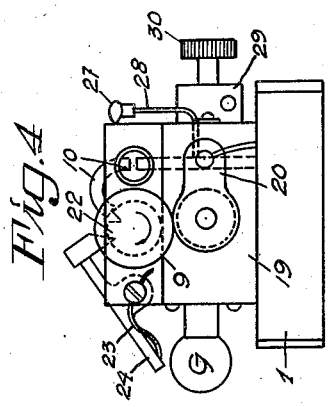
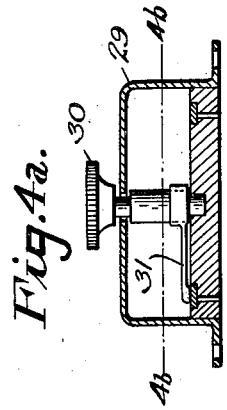
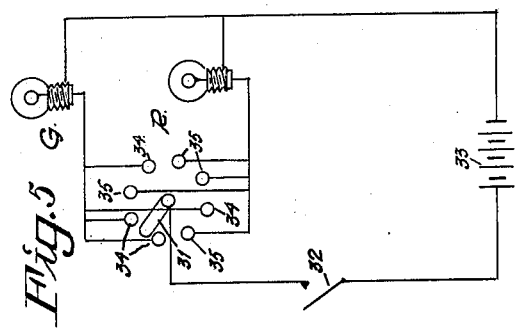
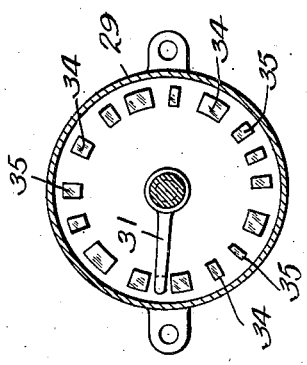

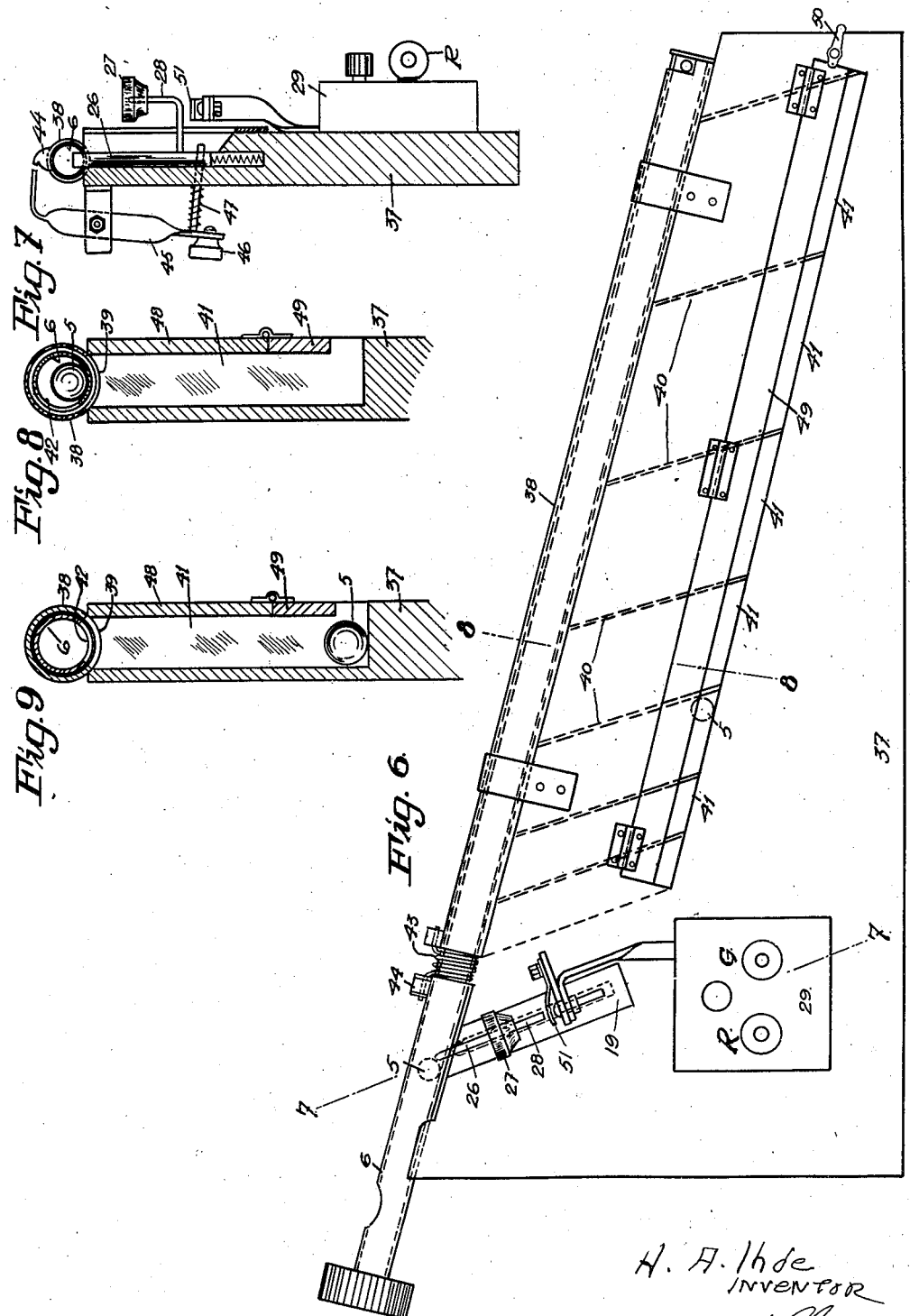

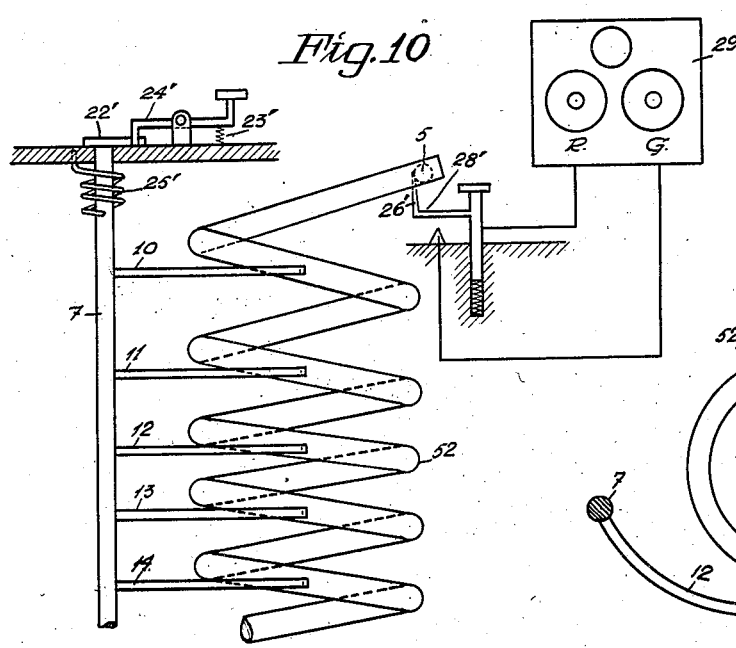
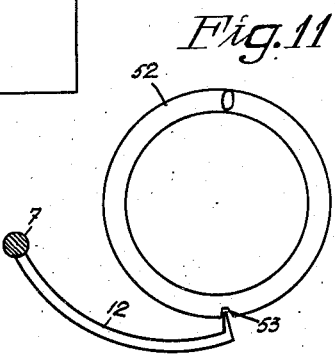
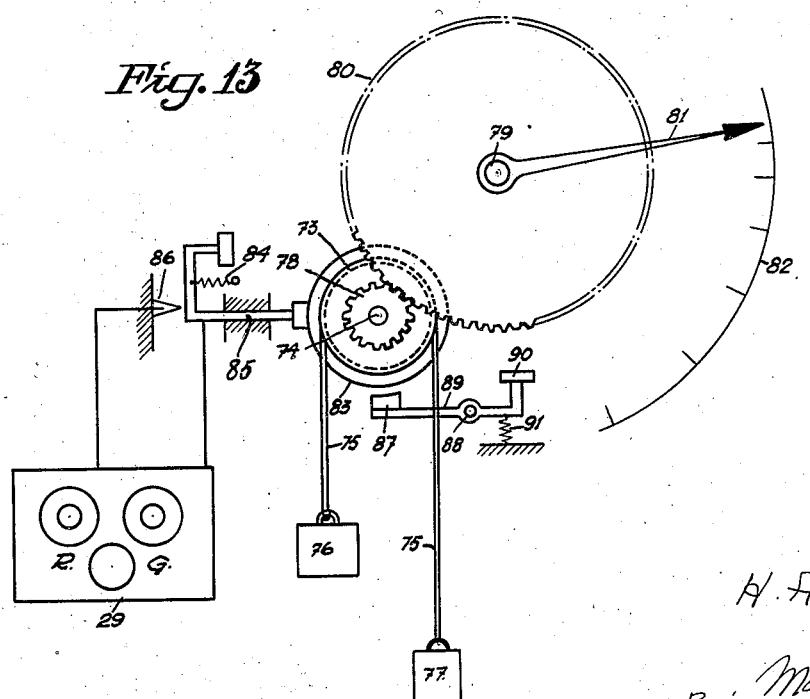

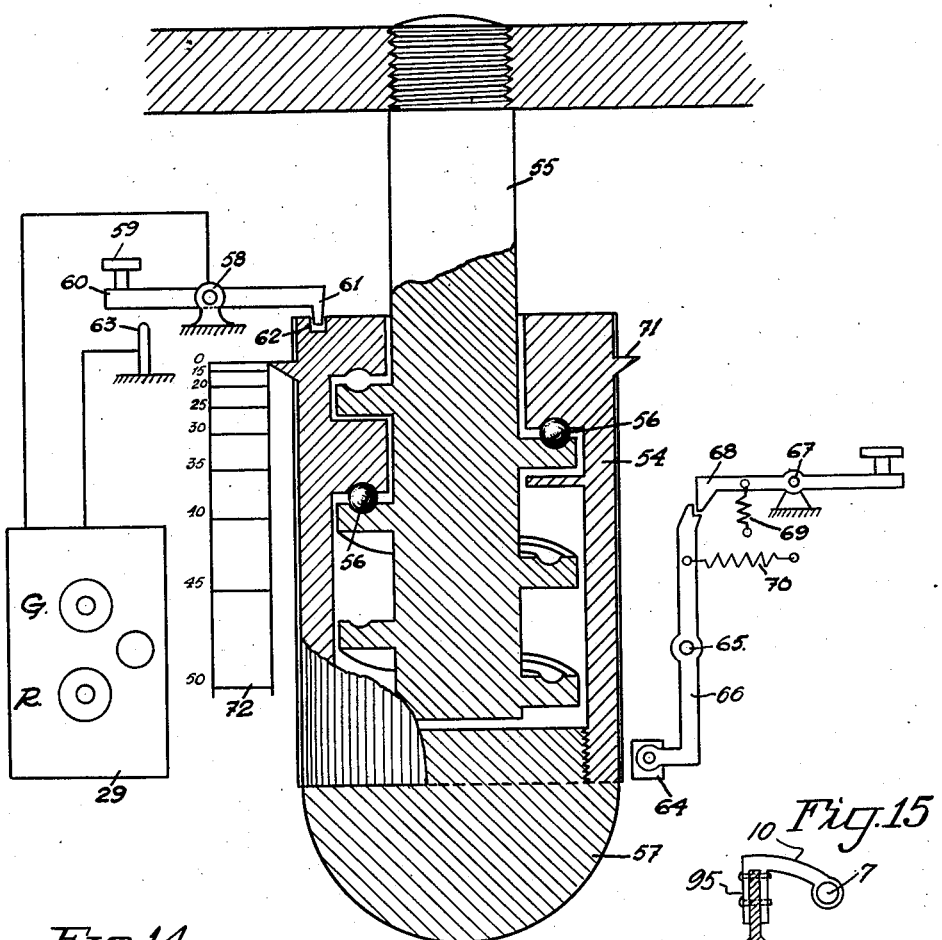
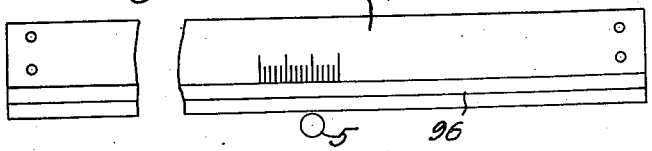

Patented Mar. 5, 1935

1,993,669

UNITED STATES PATENT OFFICE 1,993,669

APPARATUS FOR MEASURING PERIODS OF TIME, PARTICULARLY PSYCHO-PHYSICAL REACTION PERIODS

Hugo Algot Ihde, Orebro, Sweden

Application December 18, 1930, Serial No. 503,261
In Sweden February 20, 1930

3 Claims. (Cl. 161—1)

The present invention refers to apparatus for measuring periods of time, particularly psychophysical reaction periods, comprising a positively guided body which upon release is brought into movement by its own weight, means for releasing the said body from an initial position, and means for stopping the movement of the body at arbitrary moments.

Apparatus as used for these purposes suffer from the drawback that they are either complicated and require scientifically trained persons for their attendance, or expensive in manufacture, or bulky and difficult to carry about, so that they can be used only upon special preparation outside the testing institutes, or are only intended for testing of the so-called reactive velocity while not being provided with controlling members to control premature starting or to perform a multiple selective reaction.

The present invention, on the other hand, relates to a device which is simple and inexpensive in manufacture, which can be readily moved about and which is easily manageable without much instruction, and which may be used for a great variety of tests also in localities that are not especially arranged for this purpose, for instance in engine drivers' offices, at taxi cab stands and police stations, at aviation fields, in the reception rooms of medical practitioners and in private homes. In certain embodiments of the arrangement it may even be mounted in an auto car or in an air-craft. Through these properties the arrangement according to the invention invites to the performance of tests on the same person on various occasions. The psychophysical reaction power varies greatly within twenty-four hours, depending on the degree of fatigue. An attestation from an institute concerning the reactive power on a certain occasion, no matter how well the test may have been carried out scientifically, does not tell anything of value in regard to the reactive power of a person on a certain occasion, for instance immediately after a disaster, or after a person has been on duty for a certain time, or prior to the beginning of such period of service. The apparatus hitherto used for reactive tests have hardly been employed except in special institutes or special courses, whereas the present apparatus is adapted more for general use.

As stated, the present apparatus is particularly adapted for measuring psycho-physical reaction periods or so-called selective reaction periods, that is to say, the time from the giving of a signal (physiological irritation) of a certain kind agreed upon among a selection of signals (sensorial irritating agents) on to the moment when the time measuring member is stopped by the test person subjected to irritation and to the performance of selection.

The apparatus may also be used for other measuring of short periods of time falling below a second, or for the measuring of velocities on short stretches of road.

The invention consists substantially in the provision of a member for unforseen selection of sensorial irritations (vary-colored light, different sounds etc.), said member being adapted to cooperate with said timing apparatus. Here, for instance simultaneously with, or upon release of the positively guided body, the releasing means, or some other device, may mediate the closing of an electric circuit comprising a switching means, the contact points of which are connected, preferably in irregular sequence, to different branches of the said circuit, said branches comprising means to generate various sensorial irritations electrically. The contact segments of said switching means and the insulation therebetween may then preferably form a smooth surface and may be invisibly encased, besides which the movable contact member of the switching means may be provided with a uniform unmarked operating member, so that the character of the expected signal cannot be forseen, either through sensorial, aural or visual perception.

The freely movable body may preferably be arranged on a guide way for guiding same and so devised that upon release a velocity is imparted to the body which is less than that occurring in time measuring apparatus based on the principle of free fall, and preferably ⅔ at the most of the velocity at free fall.

The accompanying drawings illustrate a few embodiments of an apparatus according to this invention. Fig. 1 is an elevation of an apparatus according to one embodiment in the position taken by the apparatus when in use, and Fig. 2 is a similar view of the apparatus in closed position. Fig. 3 is a top plan view, and Fig. 4 an endwise view of the same apparatus, likewise in closed position. Figs. 4a and 4b are detail views of a multiple-way switch employed in the apparatus, Fig. 4a being a vertical section and Fig. 4b being a horizontal section on the line 4b—4b of Fig. 4a. Fig. 5 shows an electric circuit diagram for a signalling device pertaining to the apparatus. Fig. 6 is an elevation of an apparatus according to a second embodiment. Fig. 7 is a cross-section thereof on line 7—7 in Fig. 6. Figs. 8 and 9 are cross-sections to an enlarged scale on line 8—8 in Fig. 6, these figures showing an arrangement for discontinuing the movement of the freely movable body on the guide way, in two different positions. Fig. 10 is an elevation of an apparatus according to a third embodiment, and Fig. 11 shows a detail thereof. Figs. 12 and 13 show two further embodiments. Figs. 14 and 15 are detail views, showing a graduated bar to control the timing ball.

In the embodiment shown in Figs. 1-4, 1 designates a base plate having two bearing frames 2 and 3 secured to the one end thereof, in which frames a block 4 is rotatably mounted, said block constituting an attachment for the lower end of a pipe 6 serving as a guide for a ball 5, Figs. 1 and 3, said block also forming a bearing for a shaft 7 mounted parallel to said pipe. The upper end of the pipe 6 is secured in a block 8 forming the bearing for the upper end of the shaft 7 provided with a turning handle 9. Secured on the shaft 7 are locking arms 10, 11, 12, 13, 14, 15 and 16 arranged at distances increasing successively, counted from the upper end of the shaft, said locking arms being swung in through a longitudinal slot 18 in the pipe 6 so as to lock the ball 5 in different positions when the shaft is rotated in the direction of the arrow in Fig. 4.

Secured on the lower side of the block 8 and the pipe 6 is a box 19 containing an electrical battery for purposes to be set forth more fully hereinbelow, said battery being covered by a cover 20. Adjustably secured to said box are arms or braces 21, by means of which the pipe 6 may be adjusted to the desired angle of inclination, preferably 30°, as shown in Fig. 1. Starting from this angle of inclination, the locking arms 10—16 are so adjusted on the shaft 7 that the time interval for the movement of the ball 5 between any two of the said arms will be 5/100 of a second, as indicated by the graduations on the pipe 6 between 0.10 and 0.40 seconds.

The locking means 10—16 are kept in unfolded position by means of a locking disk 22 fixed to the shaft 7, said locking disk cooperating with a locking lever 24 rotatably secured to the block 8 and actuated by a spring 23, while the arms are introduced into the slot 18 of the pipe 6 through the medium of a helical spring 25 arranged about the shaft 7, the one end of said spring being connected with the shaft and the other end with the fixed block 8. Releasing of the shaft 7 locked against the action of the spring 25, by the arms 10—16, is effected by depressing the free end of the lever 24.

Locking of the ball 5 in the starting position indicated by dotted lines in Figs. 1 and 3 is effected by means of a spring-actuated rod 26 displaceable up and down in the box 19 and through the pipe 6, said rod being connected with an arm 28 provided with a push button 27, and depression of which arm causes the rod 26 to be moved out of the pipe 6 against the action of its spring (not shown) so as to release the ball 5, which then starts to roll downwards on the track formed by the pipe.

On the one side of the box 19 containing the battery is secured an electric switching device 29, the construction of which is indicated diagrammatically in Fig. 4 and shown in detail by Figs. 4a and 4b. This switching device consists of a rotatable contact arm 31 provided with a turning handle 30, Figs. 1, 3, 4, 4a and 4b, the pivot of said contact arm being connected, over a switch 32, with the one terminal of an electric battery 33, while the free end of said arm cooperates with groups 34 and 35 of contact buttons connected each over one of two electric lamps G and R to the other terminal of the battery. When the contact arm 31 is adjusted to any of the buttons 34, the lamp G, which is assumed to give green light, will be lit on actuation of the switch 32, whereas, when the arm 31 is adjusted to any of the buttons 35 the lamp R, which is assumed to give red light, will be lit. Between the contact buttons are intermediate positions for the contact arm 31, where the circuits for both lamps are broken and consequently no lamp will be lit on actuation of the switch 32. The contact buttons pertaining to the various lamps are, moreover, arranged in staggered relation to each other and enclosed within a casing, for which reason it will not be possible for an uninitiated to decide whether the green or the red lamp or none of the lamps will be lit when the switch 32 is operated.

In the embodiment shown, the switch consists of the arm 28 connected with the releasing rod 26 for the ball 5, said arm when depressed being brought into contact with the metallic casing of the switching device 27, which casing here forms a portion of the lamp circuit.

When the apparatus is to be used to determine the psycho-physical reaction of a person, the ball 5 is set to the starting position where it is kept locked by means of the rod 26. The arms 10—16 are then swung out of the pipe 6 and are kept locked in this position by means of the lever 24 engaging the locking disk 22. The switch button 30 is turned and set to any arbitrary position, which may correspond to green light, red light or no light when the switch 27, 28 (32 in Fig. 4) is operated.

The person whose condition is to be examined is then requested to depress the button 27 of the switch and, if the green lamp G is then lit, for example, to depress the locking lever 24, as well, so that the shaft 7 with the arms 10—16 is released and the arms swung into the pipe 26 so as to lock the ball 5 released at the depression of the button 27 by the arm 28 and the rod 26.

If red light or no light then results, the lever 24 shall not be caused to release the shaft with the locking arms, the ball then rolling down to the lower open end of the pipe and into a channel 36 formed thereat in the base plate 1, whence the ball may be removed and returned to the upper end of the pipe, where it is locked by the rod 26.

If the person in question is then capable of carrying out the manipulations which he is called upon to perform, in the desired manner, for instance three times in succession, that is to say to actuate the releasing lever 24 at green light only and within a period of time below 0.40 seconds, counted from the lighting up of this light, his condition may be regarded as satisfactory for a certain performance, such as the driving of a motor car.

The locking arm 10—16, at which the ball 5 is caused to stop, that is to say, the time passing between the moment at which the green light is noticed and the moment at which the shaft 6 with the locking arm is released, here constitutes a measure of the psycho-physical reaction, uniformity of the results obtained by the various tests then serving as a basis for a safer judgment of the condition, that is to say the greater the uniformity the better will the test person's condition be.

Obviously, the lamps may be replaced by audible signals or by members for sensorial reaction.

In the construction above described, the locking arms 10—16 may be replaced by a time graduated bar 95 (Figs. 14-15) preferably covered with rubber 96 on the lower side, said bar being secured to the shaft 7 in any suitable manner, for instance by means of the two outermost arms 10 and 16, said bar then serving as a brake for the ball 5 when swinging into the path of the latter. Hereby a continuous time scale is obtained in place of the intermittent time scale at the locking arms.

The embodiment shown in Figs. 6–9 corresponds in substantial parts with the construction according to Figs. 1–4. Thus the guide way for the ball 5 here also consists of a straight pipe 6 disposed in an inclined position and carried by a base plate 37 arranged in an edgewise position. The locking device for the ball consists of a spring-actuated rod 26 displaceable up and down and having connected thereto an arm 28 provided with a push button 27, said arm also serving as a switch and cooperating with a switch 29 and signalling lamps G and R in the manner described in connection with Figs. 1–5.

The shaft with locking arms and the appertaining releasable locking device as shown in Figs. 1–4 is replaced in the embodiment according to Figs. 6–9 by an arrangement to be described in the following.

Here, the pipe 6 serving as a guide way is rotatably arranged in an outer pipe 38 secured to the base plate 37, said pipe 38 being provided with a downwardly directed longitudinal opening 39 of such a width that the ball 5 may fall freely through the same. This longitudinal opening communicates with a number of chambers 41 in the base plate separated by partitions 40, the distances between said partitions corresponding to the distances between the locking arms 10—16 shown in Figs. 1–4. The inner pipe 6 is in a similar manner provided with a longitudinal opening 42, which is wider than the diameter of the ball, so that when the pipe 6 is turned in such a position that the opening 42 of the pipe 6 registers with the opening 39 in the outer fixed pipe 38, Fig. 9, the ball 5 can fall down into one of the chambers 41 formed in the base plate 37. This turning of the pipe 6 may be effected by means of a helical spring 43 arranged about the pipe 6, the one end of said spring being connected with the fixed pipe 38 and the other end with the rotatable pipe 6.

Arranged on the rotatable pipe 6 is a locking abutment 44 cooperating with a locking lever 45 swingably arranged on the plate 37, said locking lever 45 being provided with a push button 46 and being actuated by a spring 47. When the locking lever 45 is in engagement with the abutment 44, as shown in Fig. 7, the recess 42 of the rotatable pipe 6 occupies the position shown in Fig. 8, that is to say, there is no communication between said recess and the corresponding recess 39 in the fixed pipe 38.

In order to enable removal of the ball 5 fallen to the bottom of any of the chambers 41, the one side wall 48 of said chambers is formed at the lower portion thereat into a cover 49 adapted to be swung to open position, said cover not extending to the bottom of the chambers, however, but leaving the lower portion free, so that the ball which has fallen down into the one or the other chamber can be observed from the outside. Attached to the base plate 37 is a locking means 50 for the cover 49.

The mode of operation of this apparatus is substantially the same as that described in connection with Figs. 1–5.

To begin with, the button 27 is depressed, the ball 5 being thus released by the rod 26 while contact is at the same time established between the arm 28 and a contact spring 51 pertaining to the lamp circuits. If the switch 29 then happens to be so adjusted that the green lamp G is lit, the button 46 is also to be operated, the pipe 6 being then released from the locking lever 45 and swung by the action of the spring 43 into the position shown in Fig. 9, where communication is established between the openings 42 and 39 in pipes 6 and 38.

Provided the releasing button 46 is actuated within a short period of time (below ½ second) after a green signal has been flashed, the ball 5 will then fall down into any of the chambers 41, the said period of time and the uniformity of the results obtained on repeated tests then constituting a measure of the psycho-physical reaction, as above described.

The embodiment according to Figs. 10 and 11 corresponds in substantial parts with the embodiment shown in Figs. 1–4. Thus, 7 here also designates the rotatable shaft provided with locking arms 10, 11, 12 etc. which shaft is actuated for rotation by a helical spring 25', and is kept locked through the medium of a locking disk 22' and a releasing lever 24' cooperating therewith and actuated by a spring 23'. The ball 5 is locked in the starting position by the rod 26', the projecting arm 28' of which forms a switch for the circuits of the two lamps G and R, as described. As before, the switch is denoted by 29.

Here, the pipe 52 serving as a guide way for the ball 5 is helical or screw-shaped instead of straight as the pipe 6 in the embodiment according to Figs. 1–4. The pipe 52 is provided with openings 53, Fig. 11, at the points where the locking arms 10—14 are to enter in order to lock the ball rolling down in the pipe.

Manipulation of the apparatus takes place in the manner above described. The locking rod 26' is depressed and the ball 5 is released, contact being at the same time established at the arm 28'. If green light is then flashed, the lever 24' is depressed against the action of the spring 23', so that the shaft 7 is released and the arms 10—14 swing into corresponding openings 53 in the serpentine pipe 2, the ball 5 being then locked by one of the arms, provided manoeuvring is quick enough.

In this embodiment, the pitch of each turn of the serpentine pipe 52 may be chosen different, for instance so that the travelling time of the ball will be the same for all turns.

In the embodiment according to Fig. 12, the body, which is movable by its own weight, consists of a cylinder 54 provided with internal threads, said cylinder moving on a fixed vertical screw 55 provided with corresponding threads. To reduce the friction, there are arranged balls 56 between the threads. Screwed into the lower end of the cylinder 54 is a semi-spherical body 57 consisting preferably of lead. The cylinder 54 is kept locked in its upper extreme position shown in the drawings by means of a locking lever 60 mounted as at 58 and provided with a push button 59, said locking lever engaging, by a projection 61 provided at the one end thereof, into a corresponding recess 62 in the upper end surface of the cylinder, while by its other end the locking lever cooperates with a contact 63 provided in the circuits of the lamps G and R. The switch which may be arranged in the manner shown in Fig. 5, is designated by 29, as before.

To discontinue the rotary movement of the cylinder 54, and thus the axial movement thereof, there is arranged a brake shoe 64 or the like which is arranged on the one end of a lever 66 mounted as at 65, the other end of said lever cooperating with a pawl 68 mounted as at 67. The pawl is actuated by a spring 69 tending to keep the pawl in engagement with the brake lever 66, and the latter, in turn, is actuated by a second spring 70 tending to move the brake shoe 64 into contact with the cylinder 54. In order then to increase the braking effect, the surface of the cylinder is striated. The cylinder 54 is provided at the upper end with an annular flange 71 of wedge shaped cross-section, said flange serving as an indicator and cooperating with a scale 72 on which the times of fall are indicated.

When the locking lever 60 is depressed, the body 54, 57 will be released and brought into an accelerated rotary and translatory movement. At the same time the circuit is closed at the contact 63 for the green lamp G, for example. The pawl 68 is then also to be actuated, so that the braking lever 66 is released to brake the body 54, 57, whereupon the position of the annular flange 71 on the scale 72, constituting a measure of the psycho-physical reaction, is read off.

Evidently, the body 54, which is formed as a nut, may in this case be made rigid, and instead the screw 55 may serve as a falling body, and to obtain sufficient rigidness at the rotary and translatory movements, the screw and the nut may be provided with a plurality of threads.

In the embodiment shown in Fig. 13 of the drawings, 73 denotes a cord pulley freely rotatable about a shaft 74, and round this pulley extends a cord 75 having two weights 76 and 77 attached to the free ends thereof, the weight 76 being somewhat heavier than the weight 77. Connected with the cord pulley 73 is a pinion 78 engaging into a gear wheel 80 rotatable about a shaft 79. Connected with this gear wheel or with its rotary shaft is an indicator 81 indicating the times of fall of the heavier weight 76 on a scale 82. Furthermore, a brake or locking disk 83 is connected with the cord pulley 73, said disk being locked in the starting position of the weight 76 (that shown in the drawings) by a displaceable push rod 85 actuated by a spring 84, said push rod 85 also cooperating, the same as the arms 28, 28' and the lever 60 respectively in the embodiments previously described, with a contact 86 provided in the circuits of the signalling lamps G and R. In order again to brake the locking disk 83 after the same has been released, there is provided a brake shoe 87 or the like arranged on the one end of a lever 89 pivotally mounted as at 88, and the other end of said lever, which is provided with a push button 90, has a spring 91 arranged thereon, said spring tending to keep the brake shoe 87 out of contact with the locking disk 83. 29 denotes a switching device for the lamps G and R, as before.

When the pressure rod 85 is brought out of engagement with the locking disk 83, the latter is released together with the cord pulley 73 with the pinion 78. The heavier weight 76 then commences to move downwards at an accelerated velocity, and this movement is transmitted through the toothed gearing 78, 80 onto the indicator 81. Simultaneously with the commencement of this movement the contact 86 is also closed, so that the green lamp G, for example, is lighted. In this case the lever 89 is depressed by means of the button 90, and the movement of the locking disk 83, the cord pulley 73 and the toothed gearing and the indicator is stopped, whereupon the time interval between the commencement and the end of the movement is read off the scale 82.

If the shaft 74 is made rotatable, the toothed gearing (with its parts 78, 79 and 80) may be removed. A pointer rigidly connected with the shaft 74 now indicates on a reduced scale the time of fall of the heavier weight 76 directly, the excess weight of which should then be reduced relatively to the weight 77 upon removal of the toothed gearing.

As stated hereinbefore, an audible impression or a sensorial impression may be caused just as well as a visual impression when the movable body is released and, consequently, the invention is obviously not limited to the use of the light signals described. Besides, the embodiments shown are only to be regarded as examples, and may obviously be modified. Thus the release as well as the braking of the movable body, for example, may also be effected electromagnetically.

What I claim as new and desire to secure by Letters Patent of the United States of America is:

1. An apparatus for measuring psycho-physical reaction periods, comprising a timing device, means for starting said timing device, means for stopping the same at arbitrary moments, an electrical circuit having a plurality of branches, a circuit breaker in said circuit, a multiple-way switch having a movable contact member and contact segments connected to each of the branches of said circuit, members in said branches for effecting in electrical way different sensorial irritations, and means for actuating said circuit breaker to make said circuit upon actuating said starting means, said multiple-way switch being so arranged that when actuating the same the occurrence or non-occurrence of an irritation of the character thereof cannot in beforehand be foreseen.

2. An apparatus for measuring psycho-physical reaction periods, comprising a timing device, means for starting said timing device, means for stopping the same at arbitrary moments, an electrical circuit having a plurality of branches, a circuit breaker in said circuit, a multiple-way switch having a movable contact member and contact segments connected to each of the branches of said circuit, members in said branches for effecting in electrical way different sensorial irritations, and means for actuating said circuit breaker to make said circuit upon actuating said starting means, said contact segments having insulation between them and forming together therewith a smooth surface and being invisibly encased.

3. An apparatus for measuring physco-physical reaction periods, comprising a timing device, means for starting said timing device, means for stopping the same at arbitrary moments, an electrical circuit having a plurality of branches, a circuit breaker in said circuit, a multiple-way switch having a movable contact member and contact segments connected to each of the branches of said circuit, members in said branches for effecting in electrical way different sensorial irritations, and means for actuating said circuit breaker to make said circuit upon actuating said starting means, said contact segments having insulation between them and forming together therewith a smooth surface and being invisibly encased, and said movable contact member having a uniform unmarked operating member.

HUGO ALGOT IHDE.